United States Patent [19]

Seng et al.

[11] 3,839,326

[45] Oct. 1, 1974

[54] DERIVATIVES OF 2-FORMYL-3-CARBONAMIDOQUINOXALINE-DI-N-OXIDES

[75] Inventors: Florin Seng, Cologne; Kurt Ley, Odenthal-Globusch; Karl Georg Metzger, Wuppertal-Elberfeld, all of Germany

[73] Assignee: Farbenfabriken Bayer Aktiengesellschaft, Leverkusen, Germany

[22] Filed: May 1, 1972

[21] Appl. No.: 249,121

[30] Foreign Application Priority Data

May 7, 1971 Germany.............................. 2122572

[52] U.S. Cl................. 260/240 G, 99/2 AB, 99/4, 424/251, 260/243 B, 260/247.1, 260/247.2 A, 260/250 QA
[51] Int. Cl............................................ C07d 51/78
[58] Field of Search..... 260/250 QN, 240 G, 243 B, 260/247.2 A, 247.1

[56] References Cited
UNITED STATES PATENTS 3,371,090   2/1968   Johnston........................ 260/240 G
3,598,820   8/1971   Ley et al...................... 260/250 QN
3,660,401   5/1972   Berkelhammer et al..... 260/250 QN

OTHER PUBLICATIONS

McBee et al., J. Org. Chem.; Vol. 30, pgs. 3,698 to 3,705 (1965).

Houben–Weyl, Methoden der Organischen Chemie, Band X/1, p. 1119, Georg Thieme Verlag, Stuttgart Germany (1971).

*Primary Examiner*—John D. Randolph

[57] ABSTRACT

2-Formyloximido-3-aminocarbonylquinoxaline-1,4-di-N-oxides are antimicrobial agents. The compounds, of which 2-formylcarbomethoxyhydrazine-3-dimethylaminocarbonylquinoxaline-1,4-di-N-oxide is a typical embodiment, are prepared from the reaction of the corresponding 2-bis(halogeno) methyl-quinoxaline derivative and hydroxylamine or an appropriate hydrazinocarbonic acid ester in the presence of a primary or secondary amine and water.

40 Claims, No Drawings

DERIVATIVES OF 2-FORMYL-3-CARBONAMIDOQUINOXALINE-DI-N-OXIDES

The present invention relates to derivatives of 2-formyl-3-carbonamidoquinoxaline-di-N-oxides, to methods for their production and use as antimicrobial agents and feed additives, and to compositions adapted to these uses.

In particular, this invention provides 2-formyl-3-carbonamidoquinoxaline-di-N-oxide compounds of the formula:

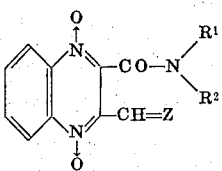

wherein
each of $R^1$ and $R^2$, independent of the other, is hydrogen, lower alkyl, hydroxy(lower alkyl), (lower alkoxy) lower alkyl, cyclopentyl, cyclohexyl or cycloheptyl, or $R^1$ and $R^2$, together with the nitrogen atom to which they are attached, are pyrrolidino, piperidino, hexamethyleneimino, morpholino or thiomorpholino; and
Z is

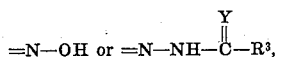

in which Y is an oxygen or sulfur atom and $R^3$ is lower alkyl, hydroxy(lower alkoxy), lower alkoxy, pyridyl, or $-NR^5R^6$ in which each of $R^5$ and $R^6$, independent of the other, is hydrogen, lower alkyl, hydroxy (lower alkyl) or lower alkoxy(lower alkyl), or $R^5$ and $R^6$, together with the nitrogen atom to which they are attached, are pyrrolidino, piperidino, hexamethyleneimino, morpholino or thiomorpholino.

The term lower alkyl denotes a univalent saturated branched or straight hydrocarbon chain containing from one to six carbon atoms. Representative of such lower alkyl groups are thus methyl, ethyl, propyl, isopropyl, butyl, isobutyl, sec.butyl, tert.butyl, pentyl, isopentyl, neopentyl, tert.pentyl, hexyl, and the like.

The term lower alkoxy denotes a straight or branched hydrocarbon chain bound to the remainder of the molecule through an ethereal oxygen atom as, for example, methoxy, ethoxy, propoxy, isopropoxy, butoxy, isobutoxy, pentoxy and hexoxy.

These compounds are obtained by allowing a 2-bis(halogeno)methyl-3-carbonamidoquinoxaline to react with hydroxylamine or hydrazine derivative in the presence of a primary or secondary amine. This reaction may be represented as follows:

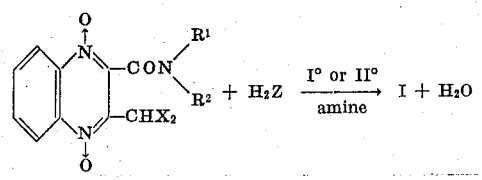

In the above, X is chloro or fluoro and $R^1$, $R^2$ and Z are as defined above.

The reaction is carried out at temperatures from about 0° to about 50°C, preferably between 10° and 30°C, at normal or elevated pressure, generally normal pressure.

Preferably 1 to 2 mols of the hydrazine reactant or hydroxylamine, and preferably 2 mols of the primary or secondary amine are used per mol of the bishalogenomethyl compound. The amount of the amine employed can however be varied within wide limits. The nature of the primary or secondary amine used is relatively unimportant and it is possible to use alkyl, aralkyl, or aromatic amines such as methylamine, ethylamine, propylamine, dimethylamine, methylethylamine, ethylpropylamine, diethylamine and the like. The amines can be introduced into the reaction solution as gases or be in the form of their aqueous solutions. The reaction is preferably conducted in an inert organic solvent, particularly a polar organic solvent such as alkanol, as for example methanol or ethanol; alkanoic nitriles such as acetonitrile, dimethylformamide and the like. Mixtures of these and of water can also be employed. It is advantageous to carry out the reaction in the presence of water, preferably of 0.1 to 50, especially 1 to 20 percent by weight of water relative to the weight of the solvent. Even catalytic amounts of water can favorably influence the reaction. Thus the bis(-halogeno)methyl compound is suspended in one of the solvents, hydroxylamine or the hydrazine derivative and water are added, and approximately the calculated amount of a primary or secondary amine is added dropwise, with cooling if necessary. The compounds thus produced are isolated by convention methods.

The quinoxaline derivatives of this invention show strong antimicrobial effects. This activity can be observed against Gram positive and Gram negative bacteria, such as: Enterobacteriaceae, for example Escherichiae, especially *Escherichia coli*; Proteae, for example *Proteus vulgaris*, *Proteus mirabilis*, *Proteus morganii* and *Proteus rettgeri*; Klebsielleae, for example *Klebsiella pneumoniae*; Salmonelleae; Pseudomonadaceae, for example *Pseudomonas aeruginosa*; Aeromonas, for example *Aeromonas liquefaciens*; Clostridia, for example *Clostridium botulinum* and *Clostridium tetani*; Cocci, especially Staphylococci, for example *Staphylococcus aureus*; Streptococci, for example *Streptococcus pyogenes*; Enterococci, for example *Streptococcus faecalis*; Mycoplasmae, for example *Mycoplasma pneumoniae* and *Mycoplasma hominis*; Mycobacteria; Pasteurella, for example *Pasteurella multocida*; and Bordetella, for example *Bordetella bronchiseptica*. As a result of this activity and their low toxicity, the compounds are useful in human and veterinary medicine in the treatment of infections in animals caused by Gram positive and Gram negative bacteria and by mycoplasma. Infections of the respiratory tracts in poultry, especially in chicks, and mastitis of cows can be mentioned as particularly responsive to such treatment.

The method of treatment of microbial infections in animals according to this invention comprises the administration to the animal of an antimicrobially effective amount of a quinoxaline of Formula I. The amount administered will of course depend upon the nature and severity of the infection, whether the treatment is curative or prophylactic, the age and condition of the recipient of the treatment and the method of administration and dosage regimen. Generally, however, a suitable response is observed with daily doses of from 1 to 100 mg/kg of body weight, especially 10 to 80 mg/kg. This of course must be adjusted to the individual case, utilizing sound professional judgment and careful observation of the response obtained.

As representative of the spectrum of antimicrobial activity for these compounds, the following representative minimum inhibitory concentrations shown on Tables A, B and C can be noted:

Table A

Minimum Inhibitory Concentrations In Vitro, in μg/ml of Medium

| Compound of Example No. | Klebsiella | | Staphylococcus aureus 133 | Streptococcus pyogenes | Escherichia coli | | Proteus vulgaris species |
|---|---|---|---|---|---|---|---|
| | 63 | 8085 | | | C 165 | A 261 | |
| 10 | 100 | 100 | 100 | 100 | — | — | — |
| 11 | 100 | 100 | 100 | 100 | — | — | — |
| 12 | 100 | 100 | 10 | 100 | 100 | — | — |
| 13 | 100 | 10 | 100 | 100 | 100 | 100 | 100 |
| 14 | — | 100 | 100 | 100 | — | — | — |
| 15 | 100 | 100 | 100 | 10 | 100 | 100 | — |
| 16 | — | 100 | 100 | 100 | — | — | — |
| 17 | 100 | 10 | 100 | 100 | 100 | 100 | — |
| 18 | 100 | 10 | 100 | 100 | 100 | 100 | 100 |
| 19 | 100 | 100 | 100 | 100 | 100 | 100 | 100 |
| 26 | 100 | 10 | 100 | 100 | 100 | — | — |
| 27 | — | 100 | — | 100 | — | — | — |

Table B

| Compound of Ex. No. | Clostridium | | Mycoplasma | | | Pasteurella multocida ATCC |
|---|---|---|---|---|---|---|
| | tetani | botulinum | MS | $S_8$ | gran | |
| 10 | 10 | 10 | 100 | 10 | 10 | 1 |
| 11 | 10 | 10 | 100 | 10 | 10 | 1 |
| 12 | 10 | 10 | 100 | 10 | 10 | 1 |
| 13 | 100 | 100 | 100 | 100 | 100 | 100 |
| 14 | 100 | 100 | 100 | 100 | 100 | 100 |
| 15 | 100 | 100 | 100 | 100 | 100 | 100 |
| 16 | 100 | 100 | 100 | 100 | 100 | 100 |
| 17 | 100 | 100 | 100 | 100 | 100 | 100 |
| 18 | 100 | 100 | 100 | 100 | 100 | 100 |
| 19 | 100 | 100 | 100 | 100 | 100 | 100 |
| 20 | 100 | 100 | 100 | 100 | 100 | 100 |
| 21 | 100 | 1 | 10 | 1 | 0.1 | 10 |
| 22 | 100 | 1 | 100 | 10 | 10 | 10 |
| 23 | 100 | 1 | 100 | 100 | 1 | 100 |
| 24 | 100 | 1 | 100 | 100 | 1 | 100 |
| 25 | 100 | 1 | 100 | 100 | 1 | 100 |
| 26 | 100 | 1 | 100 | 100 | 0.1 | 100 |
| 27 | 100 | 100 | 100 | 100 | 100 | 100 |
| 28 | 100 | 100 | 100 | 100 | 100 | 100 |
| 29 | 100 | 100 | 100 | 100 | 100 | 100 |

Table C

| Compound of Example No. | Alcaligenes faecalis ATCC | Bordetella bronchiseptica | Aeromonas liquefaciens | Mycobacterium species |
|---|---|---|---|---|
| 10 | 100 | 100 | 100 | 100 |
| 11 | 100 | 100 | 100 | 100 |
| 12 | 100 | 100 | 100 | 100 |
| 13 | 100 | 100 | 100 | 100 |
| 14 | 100 | 100 | 100 | — |
| 15 | 100 | 100 | 100 | 100 |
| 16 | 100 | 100 | 100 | — |
| 17 | 100 | 100 | 100 | 100 |
| 18 | 100 | 100 | 100 | 100 |
| 19 | 100 | 100 | 100 | 40 – 100 |
| 20 | 100 | 100 | 100 | 100 |
| 21 | 100 | 100 | 1 | 100 |
| 22 | 100 | 100 | 0.1 | 100 |
| 23 | 100 | 100 | 100 | 100 |
| 24 | 100 | 100 | 100 | 100 |
| 25 | 100 | 100 | 100 | — |
| 26 | 100 | 100 | 100 | — |
| 27 | 100 | 100 | 100 | — |
| 28 | 100 | 100 | 100 | — |
| 29 | 100 | 100 | 100 | 40 |

The compounds of the present invention are administered parenterally or orally in any of the usual pharmaceutical forms. These include solid and liquid oral unit dosage forms such as tablets, capsules, powders, suspensions, solutions, syrups and the like, including sustained released preparations, and fluid injectable forms such as sterile solutions and suspensions. The term unit dosage form as used in this specification and the claims refer to physically discrete units to be administered in single or multiple dosage to animals, each unit containing a predetermined quantity of active material in association with the required diluent, carrier or vehicle. The quantity of active material is that calculated to produce the desired therapeutic effect upon administration of one or more of such units.

Powders are prepared by comminuting the compound to a suitable fine size and mixing with a similarly comminuted diluent pharmaceutical carrier such as an edible carbohydrate material as for example, starch. Sweetening, flavoring, preservative, dispersing and coloring agents can also be present.

Capsules are made by preparing a powder mixture as described above and filling formed gelatin sheaths. A lubricant such as talc, magnesium stearate and calcium stearate can be added to the powder mixture as an adjuvant before the filling operation; a glidant such as colloidal silica may be added to improve flow properties; a disintegrating or solubilizing agent may be added to improve the availability of the medicament when the capsule is ingested.

Tablets are made by preparing a powder mixture, granulating or slugging, adding a lubricant and disintegrant and pressing into tablets. A powder mixture is prepared by mixing the compound, suitably comminuted, with a diluent or base such as starch, sucrose, kaolin, dicalcium phosphate and the like. The powder mixture can be granulated by wetting with a binder such as syrup, starch paste, acacia mucilage or solutions of cellulosic or polymeric materials and forcing through a screen. As an alternative to granulating, the powder mixture can be run through the tablet machine and the resulting imperfectly formed slugs broken into granules. The granules can be lubricated to prevent sticking to the tablet forming dies by means of the addition of stearic acid, a stearate salt, talc or mineral oil. The lubricated mixture is then compressed into tablets. The medicaments can also be combined with free flowing inert carriers and compressed into tablets directly without going through the granulating or slugging steps. A protective coating consisting of a sealing coat of shellac, a coating of sugar or polymeric material and a polish coating of wax can be provided. Dyestuffs can be added to these coatings to distinguish different unit dosages.

Oral fluids such as syrups and elixirs can be prepared in unit dosage form so that a given quantity, e.g., a teaspoonful, contains a predetermined amount of the compound. Syrups can be prepared by dissolving the compound in a suitably flavored aqueous sucrose solution while elixirs are prepared through the use of a non-toxic alcoholic vehicle. Suspensions can be formulated by dispersing the compound in a non-toxic vehicle in which it is insoluble.

Fluid unit dosage forms for parenteral administration can be prepared by suspending or dissolving a measured amount of the compound in a non-toxic liquid vehicle suitable for injection such as an aqueous or oleaginous medium and sterilizing the suspension or solution. Alternatively a measured amount of the compound is placed in a vial and the vial and its contents are sterilized and sealed. An accompanying vial or vehicle can be provided for mixing prior to administration.

In addition to their therapeutic use, the new compounds can also be used to promote the growth and improve feed utilization in animals, especially in raising young animals and fat-stock animals, as for example, calves, piglets and chicks.

The compounds can be administered in the feedstuff, in special feedstuff preparations, in preparations containing vitamins and/or mineral salts, or in the drinking water. Such administration of the compounds permits prevention or treatment of infections caused by Gram negative and by Gram positive bacteria and by mycoplasma, and additionally contributes to a more rapid growth of the animals and to better feed efficiency. In this embodiment, the compounds are preferably mixed into the feedstuff or the drinking water in a concentration of 1 to 200 ppm.

The use of these compounds as feed additives can be seen from the following feeding experiments (Table D).

Chicks in groups of 12 were kept in cages and supplied with water ad libitum and a complete chick feed into which was intimately mixed the indicated amount of the test compound. The results are as follows:

Table D

Chick Fattening Test Using the Compound of Example 20

| | Concentration ppm | Initial Weight (g) of each animal | Average Weight of each animal after | | Absolute Weight Increase (g) of each animal after | | Relative Weight Increase(%) after | |
|---|---|---|---|---|---|---|---|---|
| | | | 14 days | 28 days | 14 days | 28 days | 14 days | 28 days |
| Test 1 Control | 0 | 59.3 | 170.8 | 335.2 | 111.5 | 275.9 | 100.0 | 100.0 |
| Compound of Example 20 | 50 | 59.3 | 179.2 | 346.6 | 119.9 | 287.3 | 107.4 | 104.1 |
| Test 2 Control | 0 | 59.1 | 168.3 | 351.6 | 109.2 | 292.5 | 100.0 | 100.0 |
| Compound of Example 20 | 10 | 59.1 | 173.3 | 358.3 | 114.2 | 299.2 | 104.5 | 102.2 |
| | 20 | 59.1 | 175.8 | 360.0 | 116.7 | 300.9 | 106.8 | 102.8 |

The following examples will serve to further typify the nature of this invention without a limitation on the scope thereof:

EXAMPLE 1

2-formylcarbomethoxyhydrazone-3-methylaminocarbonylquinoxaline-1,4-di-N-oxide

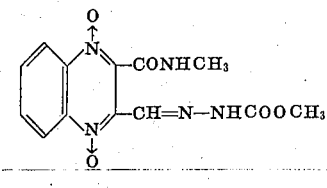

20 g (0.2 mol) of 45% strength aqueous dimethylamine solution are slowly added dropwise, with stirring, to a suspension of 30.2 g (0.1 mol) of 2-dichloromethyl-3-methylaminocarbonylquinoxaline-1,4-di-N-oxide (Reactant A) and 10 g (0.11 mol) of hydrazinocarbonic acid monomethyl ester (Reactant B) in 120 ml of alcohol and 10 ml of water. After 5 hours the product is filtered off and 25 g (78.5 percent of theory) of 2-formylcarbomethoxyhydrazine-3-methylaminocarbonylquinoxaline-1,4-di-N-oxide are obtained as yellow crystals which after recrystallization from acetic acid melt at 228°C, with decomposition.

| Analysis: | $C_{13}H_{13}N_5O_5$ (319) | | |
|---|---|---|---|
| Calculated: | C 49.0% | H 4.0% | N 21.9 |
| Found: | C 48.8% | H 4.0% | N 21.9% |

The 2-dichloromethyl-3-carboxylic acid-methylamidoquinoxaline-di-N-oxide required as the starting compound, of the formula

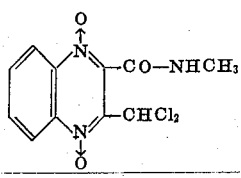

is obtained as follows: 340 g of chlorine are slowly passed into a solution of 466 g (2 mols) of 2-methyl-3-carboxylic acid-methylamido-quinoxaline-di-N-oxide in acetic acid at 80°–85°C. Thereafter the mixture is cooled to +15°C and the precipitate which has formed is filtered off. 480 g (80 percent) of 2-dichloromethyl-3-carboxylic acid-methylamido-quinoxaline-di-N-oxide are obtained as yellow crystals which after recrystallization from ethanol melt at 185°C.

| Analysis: | $C_{11}H_9Cl_2N_3O_3$ (302) | | |
|---|---|---|---|
| Calculated: | C 43.7% | H 2.98% | Cl 23.6% |
| Found: | C 43.2% | H 3.1% | Cl 23.1% |

The remaining dichloro compounds required as starting compounds are obtainable analogously.

EXAMPLES 2-37

In a similar fashion to that described in Example 1, the following reactants are allowed to react:

| Example No. | Reactant A |
|---|---|
| 2–9 | 2-dichloromethyl-3-dimethylamino-carboxylquinoxaline-1,4-dioxide |
| 10 | 2-dichloromethyl-3-piperidino-carboxylquinoxaline-1,4-dioxide |
| 11 | 2-dichloromethyl-3-diethylamino-carboxylquinoxaline-1,4-dioxide |
| 12 | 2-dichloromethyl-3-pyrrolidino-carboxylquinoxaline-1,4-dioxide |
| 13 | 2-dichloromethyl-3-methylamino-carboxylquinoxaline-1,4-dioxide |
| 14 | 2-dichloromethyl-3-β-hydroxyethyl-aminocarboxylquinoxaline-1,4-dioxide |
| 15 | 2-dichloromethyl-3-n-propylamino-carboxylquinoxaline-1,4-dioxide |
| 16 | 2-dichloromethyl-3-cyclohexylamino-carboxylquinoxaline-1,4-dioxide |
| 17 | 2-dichloromethyl-3-isopropylamino-carboxylquinoxaline-1,4-dioxide |
| 18 | 2-dichloromethyl-3-ethylamino-carboxylquinoxaline-1,4-dioxide |
| 19 | 2-dichloromethyl-3-methylamino-carboxylquinoxaline-1,4-dioxide |

-Continued

| Example No. | Reactant A |
|---|---|
| 20 | 2-dichloromethyl-3-β-hydroxyethyl-aminocarboxylquinoxaline-1,4-dioxide |
| 21 | 2-dichloromethyl-3-morpholino-carboxylquinoxaline-1,4-dioxide |
| 22 | 2-dichloromethyl-3-ethylamino-carboxylquinoxaline-1,4-dioxide |
| 23 | 2-dichloromethyl-3-n-propylamino-carboxylquinoxaline-1,4-dioxide |
| 24 | 2-dichloromethyl-3-i-propylamino-carboxylquinoxaline-1,4-dioxide |
| 25–26 | 2-dichloromethyl-3-methylamino-carboxylquinoxaline-1,4-dioxide |
| 27–29 | 2-dichloromethyl-3-β-hydroxyethyl-carboxylquinoxaline-1,4-dioxide |
| 30–33 | 2-dichloromethyl-3-β-methoxyethyl-carboxylquinoxaline-1,4-dioxide |
| 34 | 2-dichloromethyl-3-diethylamino-carboxylquinoxaline-1,4-dioxide |
| 35 | 2-dichloromethyl-3-morpholino-carboxylquinoxaline-1,4-dioxide |
| 36 | 2-dichloromethyl-3-piperidino-carboxylquinoxaline-1,4-dioxide |
| 37 | 2-dichloromethyl-3-pyrrolidino-carboxylquinoxaline-1,4-dioxide |

| Example No. | Reactant B |
|---|---|
| 2 | hydrazinocarbonic acid methyl ester |
| 3 | hydrazinocarbonic acid β-hydroxyethyl ester |
| 4 | hydrazinocarbonic acid ethyl ester |
| 5 | hydrazinocarboxamide |
| 6 | N-morpholinocarbonylhydrazine |
| 7 | isonicotinoylhydrazine |
| 8 | hydroxylamine |
| 9 | hydrazinothiocarboxamide |
| 10–18 | hydrazinocarbonic acid methyl ester |
| 19–20 | hydroxylamine |
| 21 | hydrazinocarbonic acid methyl ester |
| 22–24 | hydroxylamine |
| 25 | hydrazinocarbonic acid β-hydroxyethyl ester |
| 26–27 | hydrazinocarbonic acid ethyl ester |
| 28 | hydrazinocarbonic acid β-hydroxyethyl ester |
| 29 | N-morpholinocarbonylhydrazine |
| 30 | hydrazinocarbonic acid methyl ester |
| 31 | hydrazinocarbonic acid ethyl ester |
| 32 | hydroxylamine |
| 33 | hydrazinocarbonic acid β-hydroxyethyl ester |
| 34–37 | hydroxylamine |

The following products are thus respectively obtained:

$$\text{quinoxaline-1,4-dioxide with 2-CO-N}R^1R^2 \text{ and 3-CH=Z substituents}$$

| Example number | NR¹R² | Z | Melting point (° C.) |
|---|---|---|---|
| 2 | N(CH₃)₂ | N—NH—CO—OCH₃ | 203, 204 |
| 3 | Same as above | N—NH—CO—O—CH₂—CH₂—OH | 185, 188 |
| 4 | do | N—NH—CO—O—C₂H₅ | 174, 76 |
| 5 | do | N—NH—CO—NH₂ | 217, 218 |
| 6 | do | N—NH—CO—N(morpholino) | 180 |
| 7 | do | N—NH—CO—(pyridyl) | 205, 206 |
| 8 | do | NOH | 182 |
| 9 | do | N—NH—CS—NH₂ | 230 |
| 10 | N-piperidino | N—NH—CO—OCH₃ | 222, 223 |
| 11 | N(C₂H₅)₂ | N—NH—CO—OCH₃ | 221, 222 |
| 12 | N-pyrrolidino | N—NH—CO—OCH₃ | 203, 206 |
| 13 | NHCH₃ | N—NH—CO—OCH₃ | 228 |
| 14 | NH—CH₂—CH₂—OH | N—NH—CO—OCH₃ | 220 |
| 15 | NH—C₃H₇ | N—NH—CO—OCH₃ | 215 |
| 16 | NH—C₆H₁₁ | N—NH—CO—OCH₃ | 223 |
| 17 | NH—CH(CH₃)₂ | N—NH—CO—OCH₃ | 226 |
| 18 | NH—C₂H₅ | N—NH—CO—OCH₃ | 227 |
| 19 | NHCH₃ | NOH | 243 |
| 20 | NH—CH₂—CH₂—OH | NOH | 230 |
| 21 | N-morpholino | N—NH—CO—OCH₃ | 236–238 |
| 22 | NHC₂H₅ | NOH | 217–220 |
| 23 | NHC₃H₇ | NOH | 224 |
| 24 | NH—CH(CH₃)₂ | NOH | 241 |
| 25 | NHCH₃ | N—NH—C(=O)—O—CH₂—CH₂—OH | 219 |
| 26 | NHCH₃ | N—NH—C(=O)—OC₂H₅ | 219–220 |
| 27 | NH—CH₂—CH₂—OH | N—NH—C(=O)—OC₂H₅ | 203–204 |
| 28 | NH—CH₂—CH₂—OH | N—NH—C(=O)—O—CH₂—CH₂—OH | 214–215 |
| 29 | NH—CH₂—CH₂—OH | N—NH—C(=O)—N(morpholino) | 190–193 |
| 30 | NH—CH₂—CH₂—OCH₃ | N—NH—C(=O)—OCH₃ | 229 |

| Example number |  $R_1$, $R_2$ on N | Z | Melting point (°C.) |
|---|---|---|---|
| 31 | NH—CH$_2$—CH$_2$—OCH$_3$ | N—NH—C(=O)—OC$_2$H$_5$ | 219 |
| 32 | NH—CH$_2$—CH$_2$—OCH$_3$ | NOH | 210 |
| 33 | NH—CH$_2$—CH$_2$—OCH$_3$ | N—NH—C(=O)—O—CH$_2$CH$_2$OH | 218 |
| 34 |  N(C$_2$H$_5$)$_2$ | NOH | 200–202 |
| 35 |  morpholino | NOH | 212 |
| 36 |  piperidino | NOH | 200–201 |
| 37 |  pyrrolidino | NOH | 210–211 |

What is claimed is:

1. A compound of the formula:

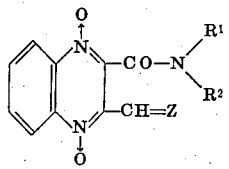

wherein
  each of R$^1$ and R$^2$, independent of the other, is hydrogen, lower alkyl, hydroxy(lower alkyl), (lower alkoxy)lower alkyl, cyclopentyl, cyclohexyl or cycloheptyl, or
  R$^1$ and R$^2$, together with the nitrogen atom to which they are attached, are pyrrolidino, piperidino, hexamethyleneimino, morpholino or thiomorpholino; and
  Z is

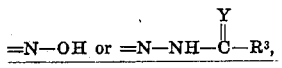

$$=N-OH \text{ or } =N-NH-\overset{\overset{Y}{\|}}{C}-R^3,$$

in which
  Y is an oxygen or sulfur atom and
  R$^3$ is lower alkyl, hydroxy(lower alkoxy), lower alkoxy, pyridyl, or NR$^5$R$^6$ in which
    each of R$^5$ and R$^6$, independent of the other, is hydrogen, lower alkyl, hydroxy(lower alkyl) or lower alkoxy(lower alkyl), or
    R$^5$ and R$^6$, together with the nitrogen atom to which they are attached, are pyrrolidino, piperidino, hexamethyleneimino, morpholino or thiomorpholino.

2. A compound according to claim 1 wherein each of R$^1$, R$^2$, independent of the other, are hydrogen, methyl, ethyl, propyl, 2-hydroxyethyl, 2-methoxyethyl, cyclohexyl or R$^1$ and R$^2$, together with the nitrogen atom to which they are attached, are pyrrolidino, piperidino or morpholino; and R$^3$ is amino, morpholino, pyridino, methoxy, ethoxy or 2-hydroxyethoxy.

3. The compound according to claim 1 which is 2-formylcarbomethoxyhydrazine-3-dimethylaminocarbonylquinoxaline-1,4-di-N-oxide.

4. The compound according to claim 1 which is 2-formylcarbomethoxyhydrazine-3-morpholinocarbonylquinoxaline-1,4-di-N-oxide.

5. The compound according to claim 1 which is 2-formylcarbomethoxyhydrazine-3-diethylaminocarbonylquinoxaline-1,4-di-N-oxide.

6. The compound according to claim 1 which is 2-formylcarbomethoxyhydrazine-3-pyrrolidinocarbonylquinoxaline-1,4-di-N-oxide.

7. The compound according to claim 1 which is 2-formyloximido-3-(2-hydroxyethyl)aminocarbonylquinoxaline-1,4-di-N-oxide.

8. The compound according to claim 1 which is 2-formylcarbomethoxyhydrazine-3-piperidinocarbonylquinoxaline-1,4-di-N-oxide.

9. The compound according to claim 1 which is 2-formyloximido-3-ethylaminocarbonylquinoxaline-1,4-di-N-oxide.

10. The compound according to claim 1 which is 2-formyloximido-3-n.-propylaminocarbonylquinoxaline-1,4-di-N-oxide.

11. The compound according to claim 1 which is 2-formyloximido-3-i.-propylaminocarbonylquinoxaline-1,4-di-N-oxide.

12. The compound according to claim 1 which is 2-formylcarbo-(2-hydroxyethoxy)hydrazine-3-methylaminocarbonylquinoxaline-1,4-di-N-oxide.

13. The compound according to claim 1 which is 2-formylcarbethoxyhydrazine-3-methylaminocarbonyl-quinoxaline-1,4l-di-N-oxide.

14. The process for the preparation of a compound of the formula:

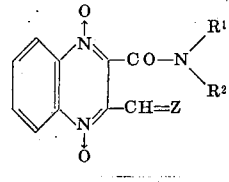

wherein
each of R¹ and R², independent of the other, is hydrogen, lower alkyl, hydroxy(lower alkyl), (lower alkoxy)lower alkyl, cyclopentyl, cyclohexyl or cycloheptyl, or R¹ and R², together with the nitrogen atom to which they are attached, are pyrrolidino, piperidino, hexamethyleneimino, morpholino or thiomorpholino; and Z is

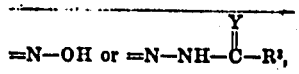

in which Y is an oxygen or sulfur atom and R³ is lower alkoxy, hydroxy(lower alkoxy), lower alkoxy(-lower alkoxy), pyridyl, or -NR⁵R⁶ in which each of R⁵ and R⁶, independent of the other, is hydrogen, lower alkyl, hydroxy(lower alkyl) or lower alkoxy(lower alkyl), or R⁵ and R⁶, together with the nitrogen atom to which they are attached, are pyrrolidino, piperidino, hexamethyleneimino, morpholino or thiomorpholino, which comprises treating a 2-dihalogenomethyl-3-carbonamidoquinoxaline-di-N-oxide of the formula:

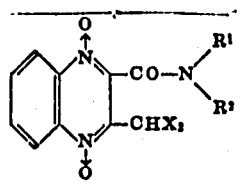

wherein R¹ and R² are as herein defined and X is a halogen atom with hydroxylamine or a compound of the formula:

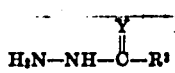

wherein Y and R³ are as herein defined, in the presence of a diluent and a primary or secondary amine and water at a temperature of 0° to 50° C.

15. The compound according to claim 1 which is 2-formylcarbomethoxyhydrazone-3-methylaminocarbonyl-quinoxazline-1,4-di-N-oxide.

16. The compound according to claim 1 wherein R¹ and R² are each methyl and Z is N—NH—CO—O—CH₂—CH₂—OH.

17. The compound according to claim 1 wherein R¹ and R² are each methyl and Z is N—NH—CO—O—C₂H₅.

18. The compound according to claim 1 wherein R¹ and R² are each methyl and Z is N—NH—CO—NH₂.

19. The compound according to claim 1 wherein R¹ and R² are each methyl and Z is

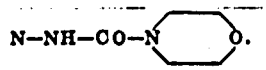

20. The compound according to claim 1 wherein R¹ and R² are each methyl and Z is

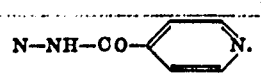

21. The compound according to claim 1 wherein R¹ and R² are each methyl and Z is NOH.

22. The compound according to claim 1 wherein R¹ and R² are each methyl and Z is N—NH—CS—NH₂.

23. The compound according to claim 1 wherein one of R¹ and R² is hydrogen and the other is methyl and Z is N—NH—CO—OCH₃.

24. The compound according to claim 1 wherein one of R¹ and R² is hydrogen and the other is hydroxyethyl and Z is N—NH—CO—OCH₃.

25. The compound according to claim 1 wherein one of R¹ and R² is hydrogen and the other is propyl and Z is N—NH—CO—OCH₃.

26. The compound according to claim 1 wherein one of R¹ and R² is hydrogen and the other is cyclohexyl and Z is N—NH—CO—OCH₃.

27. The compound according to claim 1 wherein one of R¹ and R² is hydrogen and the other is isopropyl and Z is N—NH—CO—OCH₃.

28. The compound according to claim 1 wherein one of R¹ and R² is hydrogen and the other is ethyl and Z is N—NH—CO—OCH₃.

29. The compound according to claim 1 wherein one of R¹ and R² is hydrogen and the other is methyl and Z is NOH.

30. The compound according to claim 1 wherein one of R¹ and R² is hydrogen and the other is hydroxyethyl and Z is

N—NH—C—OC₂H₅.
‖
O

31. The compound according to claim 1 wherein one of R¹ and R² is hydrogen and the other is hydroxyethyl and Z is

N—NH—C—O—CH₂—CH₂—OH.
‖
O

32. The compound according to claim 1 wherein one of R¹ and R² is hydrogen and the other is hydroxyethyl and Z is

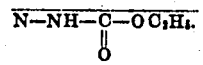

33. The compound according to claim 1 wherein one of R¹ and R² is hydrogen and the other is methoxyethyl and Z is

N—NH—C—OCH₃.
‖
O

34. The compound according to claim 1 wherein one of R¹ and R² is hydrogen and the other is methoxyethyl and Z is

N—NH—C—OC₂H₅.
‖
O

35. The compound according to claim 1 wherein one of R¹ and R² is hydrogen and the other is methoxyethyl and Z is NOH.

36. The compound according to claim 1 wherein one of $R^1$ and $R^2$ is hydrogen and the other is methoxyethyl and Z is

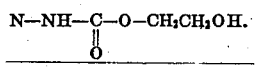

37. The compound according to claim 1 wherein $R^1$ and $R^2$ are each ethyl and Z is NOH.

38. The compound according to claim 1 wherein $R^1$ and $R^2$ together with the nitrogen atom to which they are attached are

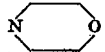

and Z is NOH.

39. The compound according to claim 1 wherein $R^1$ and $R^2$ together with the nitrogen atom to which they are attached are

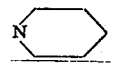

and Z is NOH.

40. The compound according to claim 1 wherein $R^1$ and $R^2$ together with the nitrogen atom to which they are attached are

and Z is NOH. Z is NOH.

* * * * *